United States Patent [19]

Baker

[11] 4,031,241
[45] * June 21, 1977

[54] CERTAIN BROMOACETOXY ACETYLENES AS SLIME CONTROL AGENTS

[75] Inventor: Don R. Baker, Orinda, Calif.

[73] Assignee: Stauffer Chemical Company, Westport, Conn.

[ * ] Notice: The portion of the term of this patent subsequent to Jan. 16, 1990, has been disclaimed.

[22] Filed: May 8, 1975

[21] Appl. No.: 575,772

Related U.S. Application Data

[63] Continuation of Ser. No. 477,957, June 10, 1974, abandoned, which is a continuation of Ser. No. 313,230, Dec. 8, 1972, abandoned, which is a continuation-in-part of Ser. No. 121,189, March 4, 1971, abandoned.

[52] U.S. Cl. .............................. 424/311; 424/314; 162/161
[51] Int. Cl.² .......................................... A01N 9/24
[58] Field of Search .................................. 424/311

[56] References Cited

UNITED STATES PATENTS 2,931,754  4/1960  Baldridge .................... 260/487
3,711,271  1/1973  Baker ......................... 424/311 X

OTHER PUBLICATIONS

Chemical Abstracts 72:123212q (1970).
B457,862, Jan. 1976, Baker, 424/311.

*Primary Examiner*—Leonard Schenkman

[57] ABSTRACT

Compounds having the formula

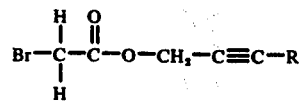

in which R is hydrogen or

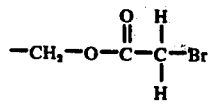

as slime control agents.

1 Claim, No Drawings

CERTAIN BROMOACETOXY ACETYLENES AS SLIME CONTROL AGENTS

This is a continuation of application Ser. No. 477,957 filed 6-10-74 which is a continuation of application Ser. No. 313,230 filed 12-8-72 which is a continuation-in-part of application Ser. No. 121,189 filed 3-4-71, now abandoned.

This invention relates to certain novel bromoacetoxy acetylene chemical compounds as slime control agents.

The compound of the present invention are those having the formula

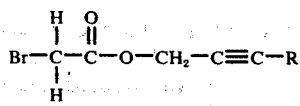

in which R is hydrogen or

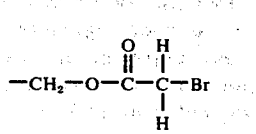

Preparation of the compounds of this invention is illustrated by the following examples:

EXAMPLE I

Preparation of 1,4-Bis-bromoacetoxy-2-butyne

Simultaneously, 80.8g of bromoacetyl bromide (0.4 moles) and 40.4g of triethyl amine (0.4 moles) are added to a stirred solution of 17.2g of 2-butyne-1,4-diol (0.2 moles) dissolves in 350 ml. of tetrahydrofuran. In order to facilitate the simultaneous addition, the volume of the bromoacetyl bromide is equalized to that of the triethyl amine by the addition of chloroform. The reaction temperature is maintained at 5°–10° C. by external cooling. After the addition is complete, stirring is continued for one hour and the reaction allowed to come to room temperature. The resulting mixture is filtered and the filtrate is diluted with an equal volume of benzene. The diluted filtrate is washed several times with water and then dried over magnesium sulfate. The dried solution is decolorized somewhat by stirring with activated charcoal. After removing the charcoal by filtration, the solution is concentrated in vacuo to yield 60.5g of a red oil (92% yield), $n_D^{30}$ 1.5239. The product has the following infrared absorption peaks (cm$^{-1}$):
2950(m), 2850(w), 1750(s), 1430(m), 1405(m), 1370(m), 1270(s), 1140(s), 1110(s), 1020(m), 970(m), 890(w), 800(w), 760(w).

EXAMPLE II

Preparation of propargyl monobromoacetate

This compound is prepared by reacting propargyl alcohol with bromoacetic acid, Specifically, 56.1g of propargyl alcohol and 139.0g bromoacetic acid and 1.0g of 2-napthalene sulfonic acid and 1000 ml. toluene were blended together and allowed to react under azeotropic conditions for 5 hours. 20 ml. of water was recovered. The product was then cooled and washed once with water, twice with sodium bicarbonate solution and again with water. The solution was dried over magnesium sulfate and filtered through silica gel. The solvent was then removed by evaporation to yield 97.9g of the desired product, a yellow oil. $n_D^{30}$ 1.4851.

Slime consists of deposits of microorganisms, fibers and debris, and it may be stringy, pasty, rubbery, tapiocalike, hard or horny and it may have a characteristic order that is different from that of the liquid suspension in which it is formed. The microorganisms involved in its formation are primarily different species of sporeforming and non-sporeforming bacteria, particularly capsulated forms of bacteria which secrete gelatinous substances that envelop or encase the cells. Slime microorganisms also include filamentous bacteria, filamentous fungi of the mold type, yeast, and yeast-like organisms. For a more detailed description of slime in liquid suspensions such as wood pulp, starches and proteinaceous substances, and its control, reference is made to U.S. Pat. No. 3,193,448, U.S. Pat. No. 26,009, and U.S. Pat. No. 3,397,144 which are incorporated herein by reference.

The compounds of the present invention are highly effective in the control of slime in essentially all liquid aqueous mediums by inhibiting the growth and reproduction of the microorganisms that produce slime in liquid suspensions or by reducing them. The microorganisms can be reduced or their growth and reproduction inhibited by adding to their habitat a microbiocidal amount of a compound having the formula

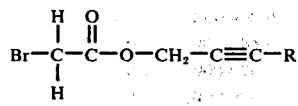

in which R is hydrogen or

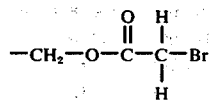

A "microbiocidal amount" of the active compound of this invention is an amount which reduces the microorganisms or inhibits the growth and reproduction of the microorganisms that produce slime. Reducing the microorganisms includes killing them. More specifically this amount is about 0.5 to 100 µg/ml of suspension to be treated.

Slime Control Testing Procedure

This test measures the slimicidal effectiveness of a compound under conditions simulating those found in industrial water treatment such as paper mill, white water systems, closed recirculating cooling towers and air conditioning systems and the like.

A paper pulp suspension was prepared by dispersing 17g of paper tissue in 3 l. of sterile distilled water. Samples of 90 ml. of the suspension were placed in 250 ml. Erlenmeyer flasks. Then, the test compound, in 0.5% acetone solution, was added to separate flasks at the levels indicated in the tables. Each flask is then innoculated with 0.5 ml. of a suspension of the desired test organism. The suspension of the test organism is prepared by adding 10 ml. of sterile distilled water to the freshly prepared slants of the desired organism. The bacteria, *Enterobacter aerogenes* and *Bacillus cereus* are grown on Tryptone Glucose Extract agar slants for 24 hours before use. The fungi, *Aspergillus niger* and *Peni-* cillium expansum were grown on Potato Dextrose agar slants for 1 week before use.

The above innoculated flasks are incubated at 37° C. After 3 hours and 24 hours 1 ml. of solution is withdrawn from each flask and serial diluted and plated on agar plates for counting. Tryptone Glucose Extract agar is used for the bacteria counting and Potato Dextrose agar is used for the fungi counting. The bacterial counting plates are incubated for 24 hours at 37° C. and the fungi counting plates are incubated for 48 hours at 30° C. The Table I summarizes the plate counts when propargyl monobromoacetate is the test compound and Table II sumarizes the plate counts when 1,4-Bis-bromoacetoxy-2-butyne is the test compound.

TABLE I

PROPARGYL MONOBROMOACETATE
Plate Count - Number of Organisms/ml

| Concentration µg/ml | Enterobacter aerogenes | Bacillus cercus | Aspergillus niger Penicilliam expansum Mixture |
|---|---|---|---|
| Three hour exposure: | | | |
| Blank | 10,000,000 | 1,700,000 | 40,000 |
| 1 | 10,000,000 | 0 | 35,000 |
| 2 | 3,400,000 | 0 | 23,000 |
| 5 | 570,000 | 0 | 11,000 |
| 10 | 570,000 | 0 | 10,000 |
| 20 | 600 | 0 | 0 |
| Twenty-four hour exposure: | | | |
| Blank | 6,700,000 | 50,000* | 1,000,000 |
| 1 | 1,100,000 | 100,000 | 26,000 |
| 2 | 440,000 | 17,000 | 6,200 |
| 5 | 1,200 | 0 | 500 |
| 10 | 0 | 0 | 0 |
| 20 | 0 | 0 | 0 |

*These samples developed a bad odor after 24 hours.

TABLE II 1,4-BIS-BROMOACETOXY-2-BUTYNE
Plate Count - Number Of Organisms/ml

| Concentration µg/ml | Enterobacter aerogenes | Bacillus cercus | Aspergillus niger Penicilliam expansum Mixture |
|---|---|---|---|
| Three hour exposure: | | | |
| Blank | 1,500,000 | 1,200,000 | 55,000 |
| 10 | 1,700 | 77,000 | 2,400 |
| 50 | 0 | 1,500 | 0 |
| 100 | 0 | 0 | 0 |
| Twenty-four hour exposure: | | | |
| Blank | — | 1,510,000 | 21,000 |
| 10 | 1,200,000 | 0 | 5,600 |
| 50 | 550,000 | 0 | 300 |
| 100 | 170,000 | 0 | 0 |

Slime and a bad odor had formed in the blank sample after 3 hours. No odor or slime had formed in the 1,4-Bis-bromoacetoxy-2-butyne treated samples. After 24 hours, slime and an odor were in all the samples except the 100 µg level for 1,4-Bis-bromoacetoxy-2-butyne.

The active compounds of this invention can be added to the habitat of the microorganisms for which control of the growth and reproduction is desired by conventional techniques. For more accurate measuring, they are normally diluted with an inactive carrier such as acetone or water. Dispersants and other conventional compounding ingredients can be added to a solution or suspension of the active ingredient with its inert carrier. Or if desired the active compounds can be formulated as a solid pesticide formulation in a conventional manner.

We claim:

1. A method of reducing the growth of slime-forming microorganism in an aqueous system comprising adding to said system an effective amount of propargyl monobromoacetate which has the structural formula

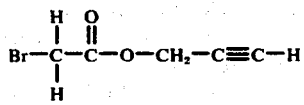

* * * * *